(12) United States Patent
Crawford

(10) Patent No.: US 7,334,745 B2
(45) Date of Patent: Feb. 26, 2008

(54) HAZING A BIRD REPELLENT SOLUTION

(76) Inventor: Gary Crawford, 2100 196th St. SW., #138, Lynnwood, WA (US) 98036

( * ) Notice: Subject to any disclaimer, the term of this patent is extended or adjusted under 35 U.S.C. 154(b) by 548 days.

(21) Appl. No.: 10/646,089

(22) Filed: Aug. 22, 2003

(65) Prior Publication Data

US 2004/0037863 A1 Feb. 26, 2004

Related U.S. Application Data

(60) Provisional application No. 60/405,633, filed on Aug. 23, 2002.

(51) Int. Cl.
*B05B 7/00* (2006.01)
*B05B 1/34* (2006.01)
*A01M 1/20* (2006.01)

(52) U.S. Cl. ............... 239/399; 239/488; 239/310; 239/490; 239/318; 43/129

(58) Field of Classification Search ............ 239/488, 239/310, 490, 318; 43/129; 424/405–409; 261/78.1, DIG. 85, 19, 30, 24, 20
See application file for complete search history.

(56) References Cited

U.S. PATENT DOCUMENTS

| | | | | |
|---|---|---|---|---|
| 3,239,960 A | * | 3/1966 | Stevens | 43/129 |
| 3,648,401 A | * | 3/1972 | Stains | 43/129 |
| 3,793,762 A | * | 2/1974 | Stains | 43/124 |
| 4,790,990 A | | 12/1988 | Mason et al. | |
| 4,990,290 A | * | 2/1991 | Gill et al. | 261/30 |
| 5,056,511 A | * | 10/1991 | Ronge | 128/200.14 |
| 5,672,352 A | | 9/1997 | Clark et al. | |
| 5,700,474 A | | 12/1997 | Preiser et al. | |
| 6,857,214 B1 | * | 2/2005 | Pelissier | 43/1 |

OTHER PUBLICATIONS

Dr. Peter F. Vogt, Control of Nuisance Birds, NCPA, 1999.
Pest Management Regulatory Agency, Avigon 14.5 Canada Goose Repellent for Turf Methyl Anthranilate, Jun. 7, 2000, PRDD2000-01.
Dr. Peter F. Vogt, Fogging of Rejex-It TP-40, Effectiveness as a Function of Droplet Size to Repel Birds, Birds Strike Meeting, Aug. 27-30, 2001, Calagary, Canada.
Kaj Umeda and Larry Sullivan, Evaluation of Methyl Anthranilate for Use as a Bird Repellent in Selected Crops, University of Arizona College of Agriculture 2001 Vegetable Report.

* cited by examiner

*Primary Examiner*—Kevin Shaver
*Assistant Examiner*—James S. Hogan
(74) *Attorney, Agent, or Firm*—Christensen O'Connor Johnson Kindness PLLC

(57) ABSTRACT

The present invention provides a method and a machine for dispersing a liquid bird repellent solution. The method includes providing a liquid bird repellent solution at a first orifice. The first orifice is defined in a liquid conduit. A flow of air is released through a second orifice to an ambient atmosphere. The second orifice is defined in an air conduit. The air conduit encloses the first orifice and contains air at a pressure significantly elevated with respect to that of the ambient atmosphere. The second orifice is spaced sufficiently apart from the first orifice to allow the flow of air to form a venturi to entrain droplets of the liquid bird repellent solution into the flow of air from the first orifice.

18 Claims, 3 Drawing Sheets

```
                  66
                 ↙

63 ── DELIVER PRESSURIZED AIR ADJACENT TO AN ORIFICE

66 ── SUPPLY A BIRD REPELLENT SOLUTION TO THE ORIFICE,
      THEREBY ALLOWING THE PRESSURIZED AIR TO
      VAPORIZE THE SUPPLIED BIRD REPELLENT SOLUTION

69 ── CARRY THE VAPORIZED BIRD REPELLENT SOLUTION
      INTO THE AMBIENT ATMOSPHERE
```

*Fig.2.*

HAZING A BIRD REPELLENT SOLUTION

PRIORITY CLAIM

This application claims priority to provisional application Ser. No. 60/405,633 entitled Bird Repellent System filed on Aug. 23, 2002. The provisional application is incorporated herein by this reference.

FIELD OF THE INVENTION

This invention relates generally to broadcast of chemicals and, more specifically, to broadcast by aerosol means.

BACKGROUND OF THE INVENTION

U.S. Pat. No. 5,700,474 issued on Dec. 23, 1997 to Marvin F. Preiser and Peter F. Vogt teaches the use of liquid bird aversion solutions including solutions having methyl anthranilate. Incorporated herein by this reference, '474 teaches solutions (referred to collectively as "the solution") for spraying onto the surface of fruits, berries, and water, etc. to neutralize the natural attraction birds have for such agricultural assets. The solution is sprayed onto the assets for protection and forms a thin film. When the birds ingest the assets, the flavor is repugnant to them.

While safe for humans, the chemistry of the solution taught in '474 breaks down to anthranilic acid, which is a corrosive chemical that causes phytotoxicity on the leaves of sprayed plants. Attempts to save the plants by encapsulating the sprayed solution in clay only delays the breakdown. The drawbacks to current bird aversion solutions include that aversion only occurs upon ingestion meanwhile, all sprayed plants suffer from phytotoxicity.

Thus, rather than wait for birds to ingest the solution, the present invention provides an airborne broadcast of the solution that repels birds without coming in direct contact with plants. A fogging machine broadcasts the solution by vaporizing its oil-based carrier with intense heat. The vapor shoots out of the exhaust tube with a noise similar to that of a lawn mower. While airborne, the droplets are inhaled by birds and cause the birds to associate the irritation and smell they detect with the place sprayed at in general and not with a specific agricultural asset, making the airborne fog an effective repellent in places such as barns, orchards and fields. Additionally, airborne fog has proven useful in hangers and on runways to protect aircraft.

Foggers produce a droplet size of solution that is approximately 30 microns in diameter on average. When foggers are used, the droplets settle out of the air too quickly and repeated foggings are necessary to achieve a prolonged effect. In addition, seeing the fog allows birds to associate the irritating quality of the fog with the presence of the fog, thus, enabling the birds to strategically avoid the fog rather than the place. Birds are also able to see the fog from afar and thus alerted, birds employ natural defenses to the fogged solution including holding their breath and deploying a mucous membrane in their eyes. Producing larger droplets proved too large for efficient repelling of birds.

Properties of the fogger also prevent entirely efficient use of the solution. The heat produced by the fogging degrades the solution. Even though some fogger settings produce at least some droplets under 10 microns, the greater portion, sometimes as much as 90%, are large droplets with their inherent shortcomings as described above.

Thus, there currently exists an unmet need in the art for a method of dispersing bird aversion solutions without the use of degrading heat to routinely produce a droplet of less than ten microns in diameter.

SUMMARY OF THE INVENTION

The present invention provides a method and a machine for dispersing a liquid bird repellent solution. The method includes providing a liquid bird repellent solution at a first orifice. The first orifice is defined in a liquid conduit. A flow of air is released through a second orifice to an ambient atmosphere. The second orifice is defined in an air conduit. The air conduit encloses the first orifice and contains air at a pressure significantly elevated with respect to that of the ambient atmosphere. The second orifice is spaced sufficiently apart from the first orifice to allow the flow of air to form a venturi to entrain droplets of the liquid bird repellent solution into the flow of air from the first orifice.

In accordance with further aspects of the present invention, the method disperses a haze of droplets with an average diameter of less than 20 microns.

In accordance with other aspects of the present invention, the machine produces a flow of air that vaporizes the droplets without the use of heat.

In accordance with still further aspects of the present invention, the machine produces a flow of air that can be made intermittent, occurring at predetermined cycles to optimize the dispersion of solution in the ambient atmosphere.

In accordance with yet other aspects of the present invention, the machine coalesces droplets with diameters in excess of 20 microns, returning the droplets to a reservoir for repeated vaporization prior to releasing them to the ambient atmosphere.

As will be readily appreciated from the foregoing summary, the present invention provides a method and a machine for the vaporization and dispersion of liquid bird repellent solutions.

BRIEF DESCRIPTION OF THE DRAWINGS

The preferred and alternative embodiments of the present invention are described in detail below with reference to the following drawings.

FIG. 2 is a flow chart of a method for dispersing a liquid bird repellent solution.

DETAILED DESCRIPTION OF THE PREFERRED EMBODIMENT

By way of overview, the present invention provides a method and a machine for dispersing a liquid bird repellent solution. The method includes providing a liquid bird repellent solution at a first orifice. The first orifice is defined in a liquid conduit. A flow of air is released through a second orifice to an ambient atmosphere. The second orifice is defined in an air conduit. The air conduit encloses the first orifice and contains air at a pressure significantly elevated with respect to that of the ambient atmosphere. The second orifice is spaced sufficiently apart from the first orifice to allow the flow of air to form a venturi to entrain droplets of the liquid bird repellent solution into the flow of air from the first orifice.

Figure 1A:
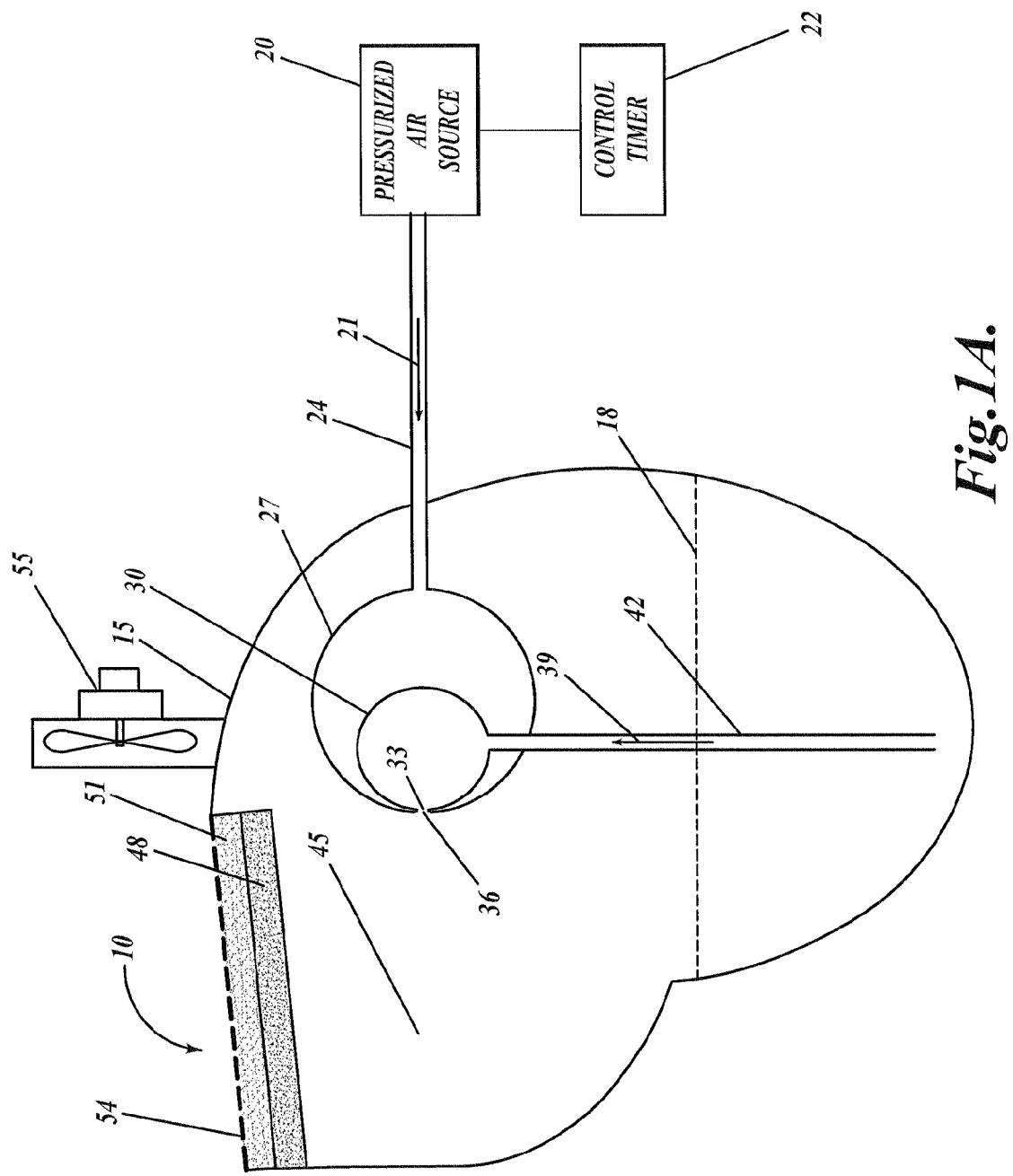
FIG. 1A is a cross-section view of the machine's hazing head showing one orifice and one jet.
Figure 1B:
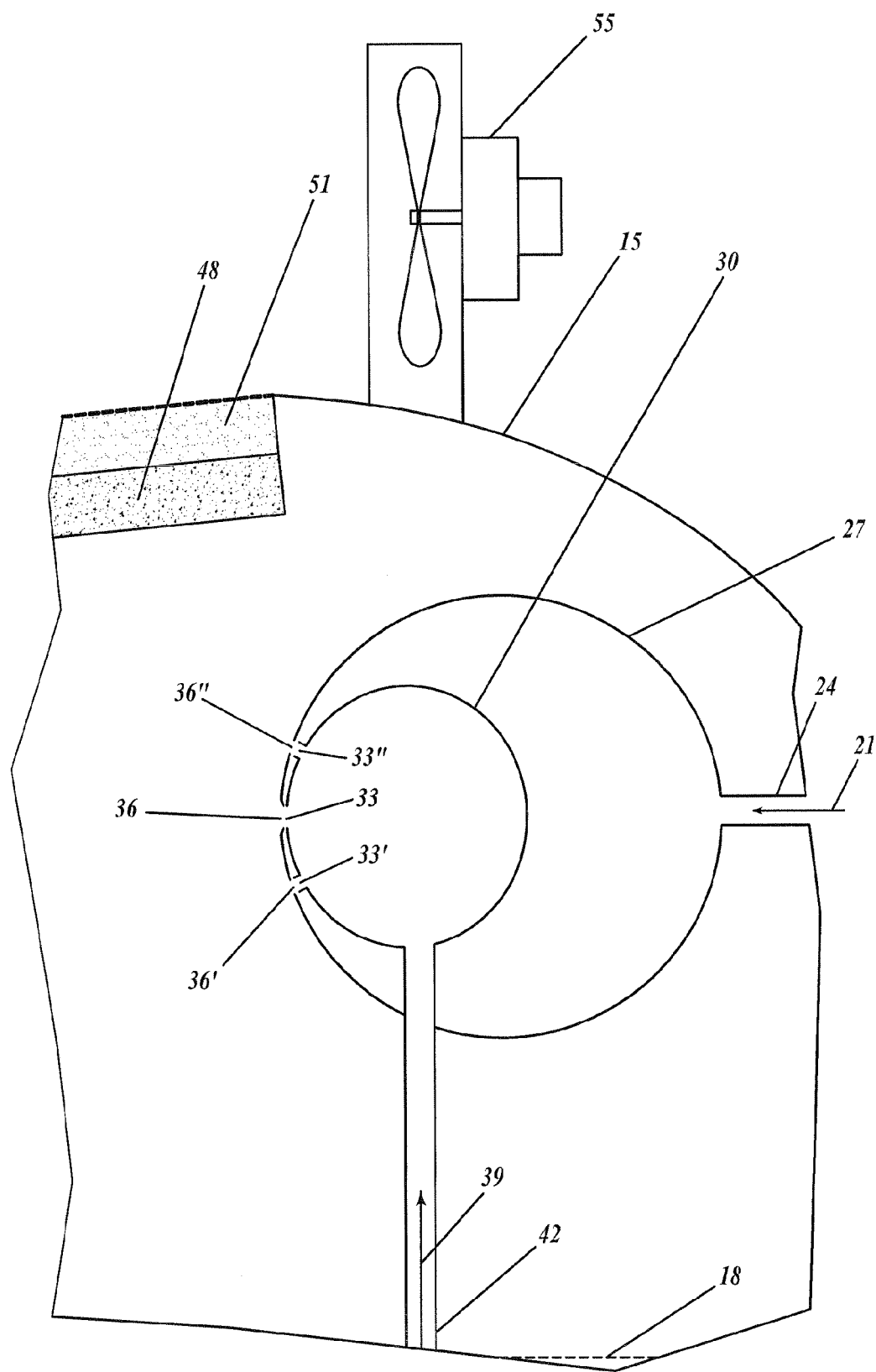
FIG. 1B is an enlarged cross-sectional view of a portion of FIG. 1A showing multiple orifices and multiple jets.

A repellent hazer 10 formed in accordance with one embodiment of the present invention is illustrated in FIG. 1. The repellent hazer 10 includes a tank 15 that is formed of a material suitably selected to be nonreactive with methyl anthranilate or any oil-based solution selected as a solvent for the methyl anthranilate. The tank 15 includes a reservoir 18 and a fluid take-up conduit 42. The reservoir 18 receives the methyl anthranilate solution from the tank 15. The fluid take-up conduit 42 includes a first end that is inserted into the methyl anthranilate solution.

The tank 15 receives a flow of air 21 through an air conduit 24. The flow of air 21 is generated by a pressurized air source 20 (controlled by an optional timer 22) located at a first end of the air conduit 24 external to the tank 15. A second end of the air conduit 24 is received in an air chamber 27 located within the tank 15. The flow of air 21 provides pressurized air to the air chamber 27. The air chamber 27 includes a fluid chamber 30. The fluid chamber 30 includes one or more orifices 33, 33', 33" located adjacent to the corresponding one or more jets 36, 36', 36" (collectively jet). The one or more orifices 33, 33', 33" and one or more jets 36, 36', 36" are defined at a point where the walls of the fluid chamber 30 meet the walls of the air chamber 27.

When pressurized air is received into the air chamber 27 and expelled out of a jet 36, 36', 36", methyl anthranilate solution is drawn up in a fluid flow 39 through the fluid take-up conduit 42 into the fluid chamber 30 and expelled out of the orifice 33, 33', 33" in droplet form. The pressurized air creates a Bernoulli effect. The droplets expelled out of the orifice 33, 33', 33" are immediately vaporized by the pressurized air escaping through the jet 36, 36', 36". The pressurized air overcomes the surface tension blasting the droplets into a mist 45 expelled out of the jet 36, 36', 36".

Optionally, a fluid feed (not shown) may be advantageously employed to replenish the reservoir 18 to keep the fluid at an optimal level for hazing. One suitable system may include a needle valve and float arrangement (both not shown).

The tank 15 includes a port 54 that allows the mist 45 to escape from the tank. In one embodiment of the present invention, the port 54 is not aligned with the discharge of mist 45 from the jet 36. Large droplets in the mist 45 return to the reservoir 18 in liquid form after they strike the one or more walls of the tank 15. Air flows through the port 54 carrying smaller droplets in the mist 45 forming a useable haze external to the tank 15. Optionally, to further filter larger droplets from being dispersed with the haze, a screen 48 and/or a filter 51 may advantageously be used to cover the port 54 within the tank 15.

The screen 48 is made of nonreactive material presenting a surface onto which the droplets may coalesce. The screen 48 is canted slightly from the horizontal plane of the tank 15 in order to allow coalesced droplets to run off the screen to the tank 15 and back to the reservoir 18. Smaller droplets remain entrained in the airflow flowing through the screen 48 and out to an ambient atmosphere. Similarly, a screen of expanded open cell foam of nonreactive material suitably may serve as a filter 51 returning droplets that coalesce on the filter 51 back to the reservoir 18.

One or more fans 55 external to the tank 15 may be employed to disperse the mist 45 expelled from the port 54.

FIG. 2 illustrates a method 60 for creating a bird repellent haze. At a block 63, pressurized air is delivered proximate to an orifice. At a block 66, a bird repellent solution is supplied to the orifice. The orifice is suitably sized to form droplets at the orifice. The flow of air 21 is sufficient to break the surface tension of the formed droplets to vaporize the droplets without the addition of heat. At a block 69, the air flow carries the vaporized droplets into the ambient atmosphere. This effect may be further augmented by additional streams or flows of air used to disperse the vaporized droplets throughout the ambient atmosphere.

While the preferred embodiment of the present invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for dispersing a liquid bird repellent solution, the method comprising:
    delivering a pressurized flow of air through a jet;
    sending a liquid bird repellent solution to an orifice;
    dispersing the liquid bird repellent solution in the pressurized flow of air; and
    filtering the droplets entrained in the flow of air to cause the removal of droplets in excess of 20 microns in diameter from the dispersed liquid bird repellent solution,
    wherein the jet is spaced sufficiently apart from the orifice to allow the flow of air to entrain droplets of the liquid bird repellent solution into the flow of air from the jet.

2. The method of claim 1, wherein the pressurized flow of air is sufficient to break the surface tension of droplets at the orifice to cause vaporization of the droplets of the liquid bird repellent solution.

3. The method of claim 1, further comprising collecting filtered droplets.

4. The method of claim 1, wherein dispersing is performed using a fan.

5. The method of claim 1, wherein the orifice includes a plurality of orifices and the jet includes a plurality of jets each of which correspond to an orifice.

6. The method of claim 1, wherein delivering the flow of air includes delivering the flow of air at predetermined intervals.

7. The method of claim 1, wherein the liquid bird repellent solution contains methyl anthranilate.

8. A machine for dispersing a liquid bird repellent solution, the machine comprising:
    a housing including a reservoir of liquid bird repellent solution, the housing defining an airspace and also including an exhaust port;
    a first conduit having an orifice, the first conduit being configured to conduct the liquid bird repelleny solution from the reservoir to the orifice, the orifice being located within the airspace; and
    a second conduit having a jet, the second conduit configured to conduct pressurized air to the jet, the jet located within the housing and being spaced sufficiently apart from the orifice to allow the pressurized air to entrain the liquid bird repellent solution out of the orifice and create a mist of the entrained liquid bird repellent solution.

9. The machine of claim 8, wherein the pressurized air is sufficient to vaporize the liquid bird repellent solution.

10. The machine of claim 9, wherein the pressurized air passes over a surface of the orifice to reduce air pressure at the surface for drawing the bird repellent solution, thus producing Venturi effect.

11. The machine of claim 8, wherein the exhaust port includes a filter configured to filter from the created mist droplets in excess of 20 microns in diameter.

12. The machine of claim 11, wherein the filter is additionally configured to direct the droplets in excess of 20 microns in diameter to the reservoir.

13. The machine of claim 8, further comprising a fan configured to propel the created mist.

14. The machine of claim 8, wherein the first conduit includes a plurality of orifices and the second conduit includes a plurality of jets.

15. The machine of claim 8, wherein the second conduit is configured to release a flow of air at predetermined intervals.

16. The machine for dispensing a bird repellent solution of claim 8, wherein the liquid bird repellent solution contains methyl anthranilate.

17. A method for dispersing a bird repellent, comprising:

providing a tank defining an interior space;

placing a quantity of bird repellent in liquid form within the interior space of the tank;

providing a nozzle assembly including at lease one nozzle in fluid communication with the interior space of the tank, the at least one nozzle including a discharge aperture;

providing an air-pressurizing source;

atomizing a portion of the bird repellent by moving air over the discharge aperture of the at least one nozzle via the air-pressuring source, thereby providing an atomized bird repellent; and filtering the atomized bird repellent through a filter member.

18. The method of claim 17, wherein the bird repellent contains methyl anthranilate.

* * * * *

UNITED STATES PATENT AND TRADEMARK OFFICE
CERTIFICATE OF CORRECTION

PATENT NO.        : 7,334,745 B2
APPLICATION NO.   : 10/646089
DATED             : February 26, 2008
INVENTOR(S)       : G. L. Crawford It is certified that error appears in the above-identified patent and that said Letters Patent is hereby corrected as shown below:

ON THE TITLE PAGE

| | | |
|---|---|---|
| Item (76) Pg. 1, | Inventor | "Gary Crawford, 2100 196$^{th}$ St. SW., #138, Lynnwood, WA (US) 98036." should read --Gary L. Crawford, 8530 202$^{nd}$ St. SW., Edmonds, WA (US) 98026.-- |

ON THE TITLE PAGE

| | | |
|---|---|---|
| Item (56) Pg. 1, | Refs. Cited (Other Publs., Item 3) | "Calagary," should read --Calgary,-- |

ON THE TITLE PAGE

| | | |
|---|---|---|
| Item (56) Pg. 1, | Refs. Cited (Other Publs., Item 4) | "Kaj" should read --Kai-- |

| COLUMN | LINE | ERROR |
|---|---|---|
| 4 (Claim 8) | 56 | "repelleny" should read --repellent-- |
| 5 (Claim 10) | 4 | "producing Venturi" should read --producing a Venturi-- |

UNITED STATES PATENT AND TRADEMARK OFFICE
CERTIFICATE OF CORRECTION

PATENT NO. : 7,334,745 B2
APPLICATION NO. : 10/646089
DATED : February 26, 2008
INVENTOR(S) : G. L. Crawford It is certified that error appears in the above-identified patent and that said Letters Patent is hereby corrected as shown below:

| COLUMN | LINE | ERROR |
|---|---|---|
| 6 (Claim 17) | 5 | "lease" should read --least-- |

Signed and Sealed this

Sixteenth Day of September, 2008

JON W. DUDAS
*Director of the United States Patent and Trademark Office*